United States Patent
Amhamed et al.

(10) Patent No.: US 11,266,945 B2
(45) Date of Patent: Mar. 8, 2022

(54) COMBINED ACID GAS REMOVAL AND WATER FILTRATION SYSTEM

(71) Applicant: QATAR FOUNDATION FOR EDUCATION, SCIENCE AND COMMUNITY DEVELOPMENT, Washington, DC (US)

(72) Inventors: Abdulkarem Ibrahim Amhamed, Doha (QA); Ahmed Mohamed Gamal Abotaleb, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 231 days.

(21) Appl. No.: 16/629,952

(22) PCT Filed: Jul. 9, 2018

(86) PCT No.: PCT/US2018/041192
§ 371 (c)(1),
(2) Date: Jan. 9, 2020

(87) PCT Pub. No.: WO2019/014083
PCT Pub. Date: Jan. 17, 2019

(65) Prior Publication Data
US 2021/0138390 A1    May 13, 2021

Related U.S. Application Data

(60) Provisional application No. 62/530,534, filed on Jul. 10, 2017.

(51) Int. Cl.
*B01D 53/14*    (2006.01)
*B01D 53/18*    (2006.01)
(Continued)

(52) U.S. Cl.
CPC ..... *B01D 53/1425* (2013.01); *B01D 53/1462* (2013.01); *B01D 53/18* (2013.01);
(Continued)

(58) Field of Classification Search
CPC ........... B01D 2252/20405; B01D 2252/20426; B01D 2252/20431; B01D 2252/20447;
(Continued)

(56) References Cited

U.S. PATENT DOCUMENTS 8,551,221 B2 * 10/2013 Wolfe .................... B01D 53/96
95/196
2003/0103884 A1    6/2003 Lynn

FOREIGN PATENT DOCUMENTS

| KR | 1001491521 B1 | 2/2015 |
| KR | 101526299 B1 | 6/2015 |
| KR | 101630054 B1 | 6/2016 |

* cited by examiner

*Primary Examiner* — Cabrena Holecek
(74) *Attorney, Agent, or Firm* — Nath, Goldberg & Meyer; Richard C. Litman

(57) ABSTRACT

The combined acid gas removal and water filtration system (10) removes sour gases, such as hydrogen sulfide (H2S) and carbon dioxide (CO2), from an input gaseous hydrocarbon stream (FG), as well as producing purified water (TW). The acid gas removal system (10) has a contactor (12) for contacting the input gaseous stream (FG) with an absorption liquid solvent (ALS), and a stripper (24) for recycling the absorption liquid solvent (ALS) and removing acidic gases (AG) therefrom. A first heat exchanger (22) heats used absorption liquid solvent (UALS) output from the contactor (12) prior to injection into the stripper (24). A second heat exchanger (26) cools recycled absorption liquid solvent (RALS) using a refrigerant (R) before injection back into the contactor (12). The refrigerant (R) is coupled with an absorber (84), which receives a dilute ethanolic draw solu-
(Continued)

tion (DDS) from a forward osmosis filtration system (72), producing purified water (TW).

18 Claims, 3 Drawing Sheets

(51) Int. Cl.
*B01D 61/00* (2006.01)
*C02F 1/44* (2006.01)
*C02F 103/18* (2006.01)

(52) U.S. Cl.
CPC ............ *B01D 61/005* (2013.01); *C02F 1/445* (2013.01); *B01D 2252/20405* (2013.01); *B01D 2252/20431* (2013.01); *B01D 2252/20447* (2013.01); *B01D 2252/20489* (2013.01); *B01D 2252/60* (2013.01); *C02F 2103/18* (2013.01)

(58) Field of Classification Search
CPC ........... B01D 2252/20484; B01D 2252/20489; B01D 2252/60; B01D 2257/702; B01D 3/145; B01D 53/1425; B01D 53/1462; B01D 53/18; B01D 61/002; B01D 61/005; C02F 1/20; C02F 1/445; C02F 2103/18; C02F 2103/365; Y02P 70/10
See application file for complete search history.

COMBINED ACID GAS REMOVAL AND WATER FILTRATION SYSTEM

TECHNICAL FIELD

The disclosure of the present patent application relates generally to the treatment of hydrocarbon gases, and particularly to a combined acid gas removal and water filtration system for the removal of acidic or "sour" gases from hydrocarbon feeds with a combined water treatment sub-system.

BACKGROUND ART

Hydrocarbon gases, such as natural gas, are often extracted from natural gas deposits or reservoirs containing additional acid or "sour" gas components, such as hydrogen sulfide ($H_2S$) and carbon dioxide ($CO_2$). FIG. 2 illustrates a conventional prior art acid gas removal system 100 for treating a feed gas stream (such as a natural gas stream) in order to remove the acid gas components. The prior art system 100 includes a contactor 112 for receiving a feed gas and an absorption liquid solvent. Typical absorption liquid solvents include amines, such as monoethanolamine (MEA). As shown, the acidic or "sour" feed gas may first be fed to a knock out drum 130, where heavy hydrocarbons, droplets of water, slugs and solids are precipitated out and may be removed through valve 132. The absorption liquid solvent contacts the gaseous stream of feed gas within the contactor 12 to remove acidic gases therefrom. A treated gas stream is output from the contactor 112, and a volume of used absorption liquid solvent (a "rich" amine) is output from the contactor 112.

An interchanger 122 is in fluid communication with the contactor 112 for receiving the volume of used absorption liquid solvent. The interchanger 122 heats the volume of used absorption liquid solvent to output a volume of heated solvent, which is fed to a stripper 124. Flow of the heated solvent between the interchanger 122 and the stripper 124 may be controlled by a valve 150.

The stripper 124 receives the volume of heated solvent ("rich" amine) and separates it into an acid gas waste stream and a volume of recycled absorption liquid solvent (a "lean" amine) The acid gas waste stream is fed through an acid gas condenser 102 for lowering its temperature prior to being fed to a reflux drum 152 where, under the power of a reflux pump 154, the acid gas waste stream is output for collection. Reflux water from the refluxing in reflux drum 152 is driven by the reflux pump 154 to feed into the stripper 124, as shown. The reflux water is combined with wash water output from the contactor 112 (under the control of valve 160) for input into the stripper 124.

The lean amine exiting the stripper 124 is fed through the interchanger 122, where it is used to heat the rich amine stream through heat exchange therewith, exiting the interchanger 122 at a lower temperature. This lean amine is pumped through a lean amine air cooler 104 (by a circulation pump 134) to further lower the temperature of the lean amine. The lean amine is then cooled even further to an appropriate temperature (approximately 52° C.) by a trim cooler 106, which uses a recirculating stream of cooling water. Following cooling by the trim cooler 106, the absorption liquid solvent (lean amine) is then fed back into the contactor 112. The stripper 124 uses low-pressure saturated steam as a heating source. Saturated steam is provided to a reboiler 136 from an external source for heat exchange with the stripper 124. The cooled steam exits the reboiler 136 as condensate C.

Conventional acid gas removal systems, such as that described above, consume large amounts of energy during the process of regenerating the rich amine to lean amine, typically on the order of 60% to 70% of the total operating cost of the system. Additionally, conventional amines used in acid gas removal have relatively low $CO_2$ loading capacities, thus requiring the use of high pressure absorber columns, high solvent circulation rates, and consequently large size contactors and strippers. The operating temperatures, pressures and size of the equipment, as well as the choice of amine, contributes to relatively high rates of equipment corrosion, and typically amines must be replaced frequently due to their degradation into organic acids. Typical amine solvents also present a problem, in that there is often co-absorption of valuable product hydrocarbon compounds, such as benzene, toluene, ethylbenzene and xylene.

As noted above, acid gas removal systems, such as that shown in FIG. 2, consume large amounts of energy. A large portion of that energy expenditure is in the heat exchange process taking place in the trim cooler 106. It would obviously be desirable to be able to provide a more efficient and effective cooling process for the lean amine. Additionally, with the proper choice of a refrigerant fluid, the energy saved by efficient heat exchange between the lean amine and the refrigerant fluid can be used for additional processes. Rather than cooling the refrigerant fluid without recovery of waste heat, the heated refrigerant could easily be used to assist in a complementary process, such as water treatment. It would obviously be further desirable to be able to utilize the circulation of the refrigerant to assist in water treatment through, for example, a linked forward osmosis filtration system. Such a system could be used to treat the water that is already being circulated through the acid gas removal system. Thus, a combined acid gas removal and water filtration system solving the aforementioned problems is desired.

DISCLOSURE

The combined acid gas removal and water filtration system removes (or "sweetens") acidic or "sour", gases, such as hydrogen sulfide ($H_2S$) and carbon dioxide ($CO_2$), from an input gaseous stream, resulting in a "sweetened" or "sweet" gas product, and further incorporates a forward osmosis (FO) water treatment sub-system. The combined acid gas removal and water filtration system includes a contactor having a gas inlet and a gas outlet. The gas inlet receives a stream of gaseous hydrocarbons, and the gas outlet outputs the gaseous hydrocarbons after removal of acidic gases therefrom. Within the contactor, the gaseous hydrocarbons are contacted by an absorption liquid solvent and the acidic gases are removed therefrom through absorption into the absorption liquid solvent. The absorption liquid solvent may be methyl diethanolamine (MDEA) with a piperazine (PZ) additive or other suitable solvent. The contactor further includes an absorption liquid inlet for introducing the absorption liquid solvent into the contactor, and an absorption liquid outlet for removing used absorption liquid solvent having the acidic gases absorbed therein from the contactor.

A first heat exchanger is in fluid communication with the contactor. The first heat exchanger is configured for receiving the used absorption liquid solvent and heating the used absorption liquid solvent to output heated solvent. The first heat exchanger may be a plate-plate heat exchanger. A stripper is in fluid communication with the first heat exchanger for receiving the heated solvent and separating the heated solvent into an acidic gas waste stream and recycled absorption liquid solvent. The recycled absorption liquid solvent provides a heat source to the first heat exchanger for heating the used absorption liquid solvent.

A second heat exchanger is in fluid communication with the first heat exchanger. The second heat exchanger may also be a plate-plate heat exchanger. The second heat exchanger receives the recycled absorption liquid solvent and also receives a refrigerant from a refrigerant tank for cooling the recycled absorption liquid solvent. The cooled, recycled absorption liquid solvent forms at least a portion of the absorption liquid solvent received by the contactor through the absorption liquid inlet. The refrigerant may be n-pentane or other suitable refrigerant.

A forward osmosis filtration system having a feed side and a draw side is also provided. The feed side has an input connected to a source of brine, and the draw side has an input connected to a source of aqueous ethanol solution. Water from the brine is mixed into the aqueous ethanol solution to form a dilute draw solution. An absorber tank receives the refrigerant from the second heat exchanger and the dilute draw solution. In the absorber tank, the refrigerant absorbs ethanol from the dilute draw solution, producing pure water and a mixture of ethanol and the refrigerant. The mixture of ethanol and the refrigerant is returned to the refrigerant tank, and a portion of the pure water is received by the contactor through a wash water inlet.

These and other features of the present disclosure will become readily apparent upon further review of the following specification and drawings.

BRIEF DESCRIPTION OF THE DRAWINGS

Similar reference characters denote corresponding features consistently throughout the attached drawings.

BEST MODE(S) FOR CARRYING OUT THE INVENTION

Figure 1:
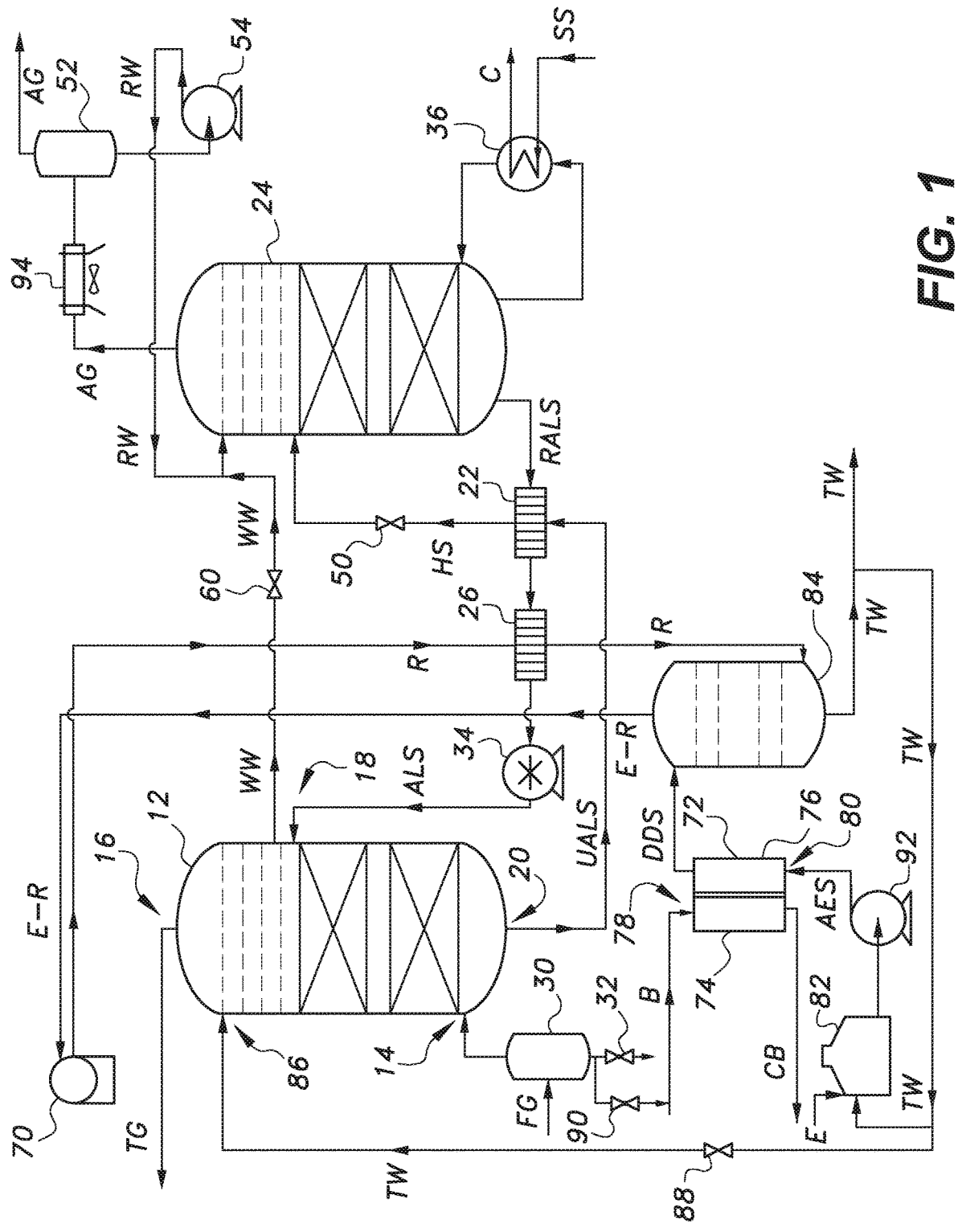
FIG. 1 is a schematic diagram of a combined acid gas removal and water filtration system.

As shown in FIG. 1, the combined acid gas removal and water filtration system 10 removes (or "sweetens") acidic or "sour", gases, such as hydrogen sulfide ($H_2S$) and carbon dioxide ($CO_2$), from an input gaseous stream, resulting in a "sweetened" or "sweet" gas product, and further incorporates a forward osmosis (FO) water treatment sub-system. The combined acid gas removal and water filtration system 10 includes a contactor 12 having a gas inlet 14 and a gas outlet 16. The gas inlet 14 receives a feed gas FG from a crude natural gas source. The feed gas FG is in the form of a stream of gaseous hydrocarbons. The gas outlet 16 outputs the gaseous hydrocarbons after removal of acidic gases therefrom to a natural gas distribution system. Within the contactor 12, the gaseous hydrocarbons are contacted by an absorption liquid solvent (ALS) (lean amine), which is received through an absorption liquid inlet 18, and the acidic gases are removed from the gaseous hydrocarbons through absorption into the absorption liquid solvent.

The acidic or "sour" feed gas FG may first be fed to a knock out drum 30, where heavy hydrocarbons, droplets of water, slugs and solids are precipitated out and may be removed through valve 32. The absorption liquid solvent may be methyl diethanolamine (MDEA) with a piperazine (PZ) additive or other suitable absorption liquid solvent. A treated gas stream TG, from which the acidic gas has been removed, is output from the contactor 12 through the gas outlet 16. A volume of used absorption liquid solvent (UALS) (rich amine) is output from the contactor 12 through an absorption liquid outlet 20.

A first heat exchanger 22 is in fluid communication with the contactor 12 for receiving the volume of used absorption liquid solvent (UALS). The first heat exchanger 22 heats the volume of used absorption liquid solvent (UALS) to output a volume of heated solvent HS. The first heat exchanger 22 is preferably an interchanger or plate-plate heat exchanger. A stripper 24 is in fluid communication with the first heat exchanger 22 for receiving the volume of heated solvent HS and separating the volume of heated solvent HS into an acidic gas waste stream AG and a volume of recycled absorption liquid solvent (RALS) (lean amine) The recycled absorption liquid solvent provides a heat source to the first heat exchanger 22 for heating the used absorption liquid solvent. As shown, flow of the heated solvent between the first heat exchanger 22 and the stripper 24 is controlled by a valve 50.

The acidic gas waste stream AG may be any type of acid gas (also sometimes referred to as a "sour gas"), such as hydrogen sulfide ($H_2S$) or carbon dioxide ($CO_2$). Following heat exchange, the acidic gas waste stream AG is fed to a reflux drum 52 where, under the power of a reflux pump 54, the acidic gas waste stream AG is output for collection. Reflux water RW from the refluxing process in the reflux drum 52 is driven by the reflux pump 54 to feed into the stripper 24, as shown. The reflux water RW is combined with the wash water WW output from the contactor 12 (under the control of a valve 60) for input into the stripper 24. The acid gas waste stream AG is first fed through an acid gas condenser 94 for lowering its temperature prior to being fed to the reflux drum 52 where, under the power of the reflux pump 54, the acid gas waste stream is output for collection.

A second heat exchanger 26 is in fluid communication with the first heat exchanger 22. Preferably, the second heat exchanger is an economizer or a plate-plate heat exchanger. The second heat exchanger 26 receives the recycled absorption liquid solvent and also receives a refrigerant R from a refrigerant tank 70 for cooling the recycled absorption liquid solvent. The cooled, recycled absorption liquid solvent forms at least a portion of the absorption liquid solvent received by the contactor 12 through the absorption liquid inlet 18. The refrigerant R may be n-pentane or other suitable refrigerant. As shown, the absorption liquid solvent (ALS) is fed back to the contactor 12 by a circulation pump 34. The required concentration of the absorption liquid solvent (ALS), along with its flow rate, are selected according to the acid gas composition(s), flow rate, and required quality of the treated gas TG.

A forward osmosis filtration system 72 having a feed side 74 and a draw side 76 separated by a semipermeable membrane is also provided. The feed side 74 has an input 78 connected to a source of brine B, and the draw side 76 has an input 80 connected to a source of aqueous ethanol solution (AES). It should be understood that the draw solution tank 82 providing the AES to the feed side 74 is shown for exemplary purposes only. As is conventionally known in forward osmosis processes, water from the brine B is selectively drawn from the feed side through the semipermeable membrane to the draw side and mixed into the aqueous ethanol solution to form a dilute draw solution (DDS), thus desalinating the brine.

An absorber tank or column 84 receives the refrigerant R from the second heat exchanger 26 and also receives the dilute draw solution (DDS) from the forward osmosis filtration system 72. In the absorber tank 84, the refrigerant R, which was heated to about 75° C. in the second heat exchanger 26, absorbs ethanol from the dilute draw solution, producing pure treated water (TW) at the bottom of the absorber column and a mixture of ethanol and the refrigerant (E-R) at the top of the absorber column 84. The absorber column 84 may be a column having ten to twelve theoretical stages for direct contact between the n-pentane and the dilute draw solution. Since ethanol is highly soluble in water, but is immiscible in water when mixed with light hydrocarbons, such as n-pentane, the desalinated water separates from the ethanol and is drawn off from the bottom of the absorber column 84 as pure water or treated water TW. The absorber column 84 does not require the application of an external source of heat to accomplish the separation of ethanol and water, and is therefore very energy efficient. The remaining mixture of ethanol and the refrigerant E-R is returned to the refrigerant tank 70, and a portion of the pure treated water TW is received by the contactor 12 through a wash water inlet 86 for use as wash water. Flow of the wash water may be controlled through a valve 88.

Droplets of water being output from the knock out drum 30 may be added to the brine B (under the control of valve 90). Following separation of the water therefrom, a concentrated brine CB is removed from the feed side 74 of the forward osmosis filtration system 72. Further, a portion of treated water TW fills the draw solution tank 82, where it is mixed with ethanol E from an external source, to form the draw solution. The draw solution may be delivered to the draw side 72 under control of a conventional pump 92.

Further, a reboiler 36 is provided for heat exchange with the stripper 24, i.e., the reboiler 36 heats the heated absorption liquid solvent to reverse the absorption process so that the acidic gases can be stripped from the absorption liquid solvent by steam in the stripper 24. Steam cooled in the process exits the reboiler 36 as condensate C. Saturated steam SS is fed to the reboiler 36 from an external source.

For an initial temperature of feed gas FG of 35° C., the re-circulating feed through the reboiler 36 preferably has a temperature of approximately 123° C. and, similarly, the recycled absorption liquid solvent (RALS) being output from the stripper 24 also has a temperature of approximately 123° C. In a conventional prior art acid gas removal system, such as the prior art system 100 described above with reference to FIG. 2, the amine absorption liquid solvent exiting the stripper 124 is typically fed through an interchanger 122, as described above, rather than being fed through the second heat exchanger 26 of the present system 10. In the conventional prior art acid gas removal system 100, the amine absorption liquid solvent exiting the interchanger 122 typically has a temperature of approximately 84° C., and then must pass through a separate amine air cooler 104 to lower its temperature to approximately 57° C., and then further be passed through an additional trim cooler 106 to further lower the temperature to approximately 52° C. before being injected into the contactor 112. In the present system 10, the additional coolers are not necessary, since the absorption liquid solvent (ALS) exiting the second heat exchanger 26 has a temperature of approximately 52° C. before being injected directly into the contactor 12. The conventional trim cooler 106 further requires a separate stream of cooling water (with a temperature of approximately 32° C.) as well as the equipment necessary to circulate this water following the heat exchange (typically with a final temperature of approximately 41° C.).

As noted above, the conventional prior art acid gas removal system 100 uses an interchanger 122 for heat exchange between the RALS exiting the stripper 124 and the used absorption liquid solvent (UALS) exiting the contactor 112. In the conventional prior art system 100, the UALS is typically heated from approximately 58° C. to approximately 100° C. by the interchanger 122. The heated UALS is then cooled slightly to approximately 93° C. before being input to the stripper 124. However, as described above, in the present system 10, the UALS is heated by the first heat exchanger 22, which raises the temperature of the UALS from approximately 58° C. to approximately 100° C. before being input to the stripper 24.

Figure 3:
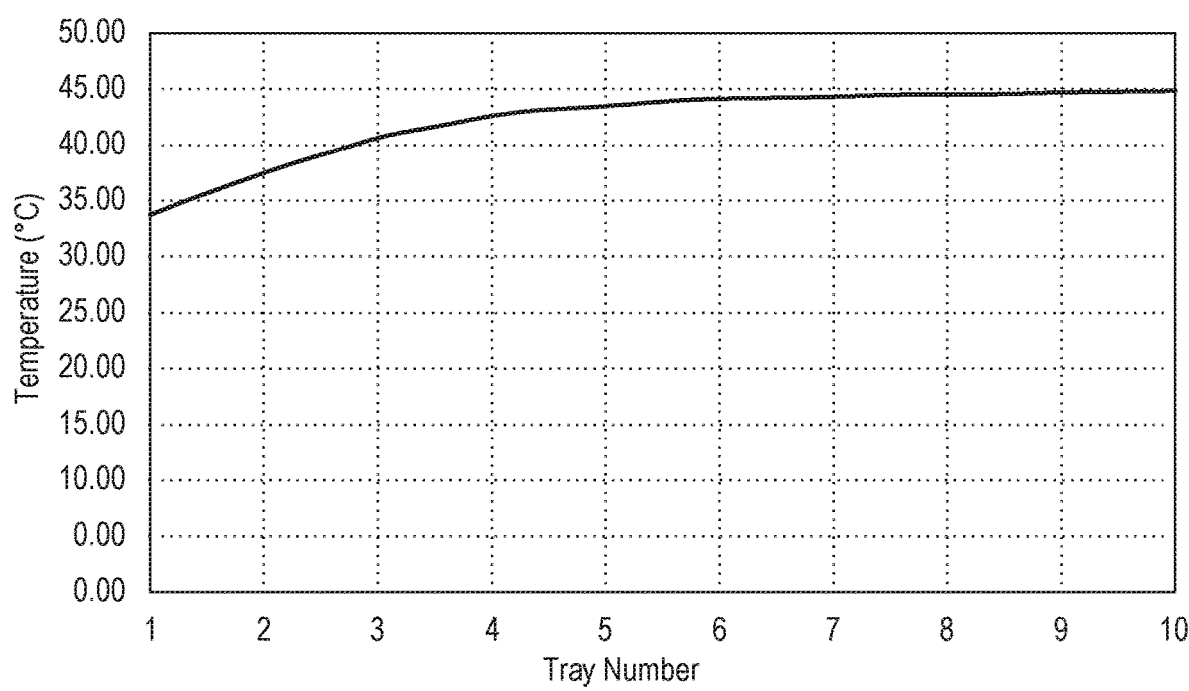
FIG. 3 is a graph illustrating temperature distribution for each stage in a direct contact absorber of the combined acid gas removal and water filtration system.

As noted above, the present system 10 preferably uses methyl diethanolamine (MDEA) with a piperazine (PZ) additive as the absorption liquid solvent. This allows for enhanced $CO_2$ loading in the amine Combining this with the above temperature differences (and corresponding differences in pressure), the present system 10, when compared against the conventional prior art system 100, enhances both carbon dioxide and acid gas loading. Returning to FIG. 1, the n-pentane refrigerant R is fed from the refrigerant tank 70 as a vapor at 34° C. to cool the lean amine from a temperature of 84° C. (when output from first heat exchanger 22) to the optimum lean amine temperature of 52° C. prior to its injection back into the contactor 12. The heated n-pentane (at a temperature of approximately 75° C.) is then contacted with the diluted draw solution (DDS) in the absorber tank 84. The absorber tank 84 is preferably a 10-stage, direct contact absorber. FIG. 3 is a graph illustrating the temperature distribution for each stage, or tray, in the absorber tank 84. As described above, the absorber tank 84 outputs both pure treated water TW and a mixture of ethanol and refrigerant (E-R). The output mixture is found to have a composition of 95.82 wt % n-pentane, 2.84 wt % ethanol, and 1.34 wt % water.

Figure 2:
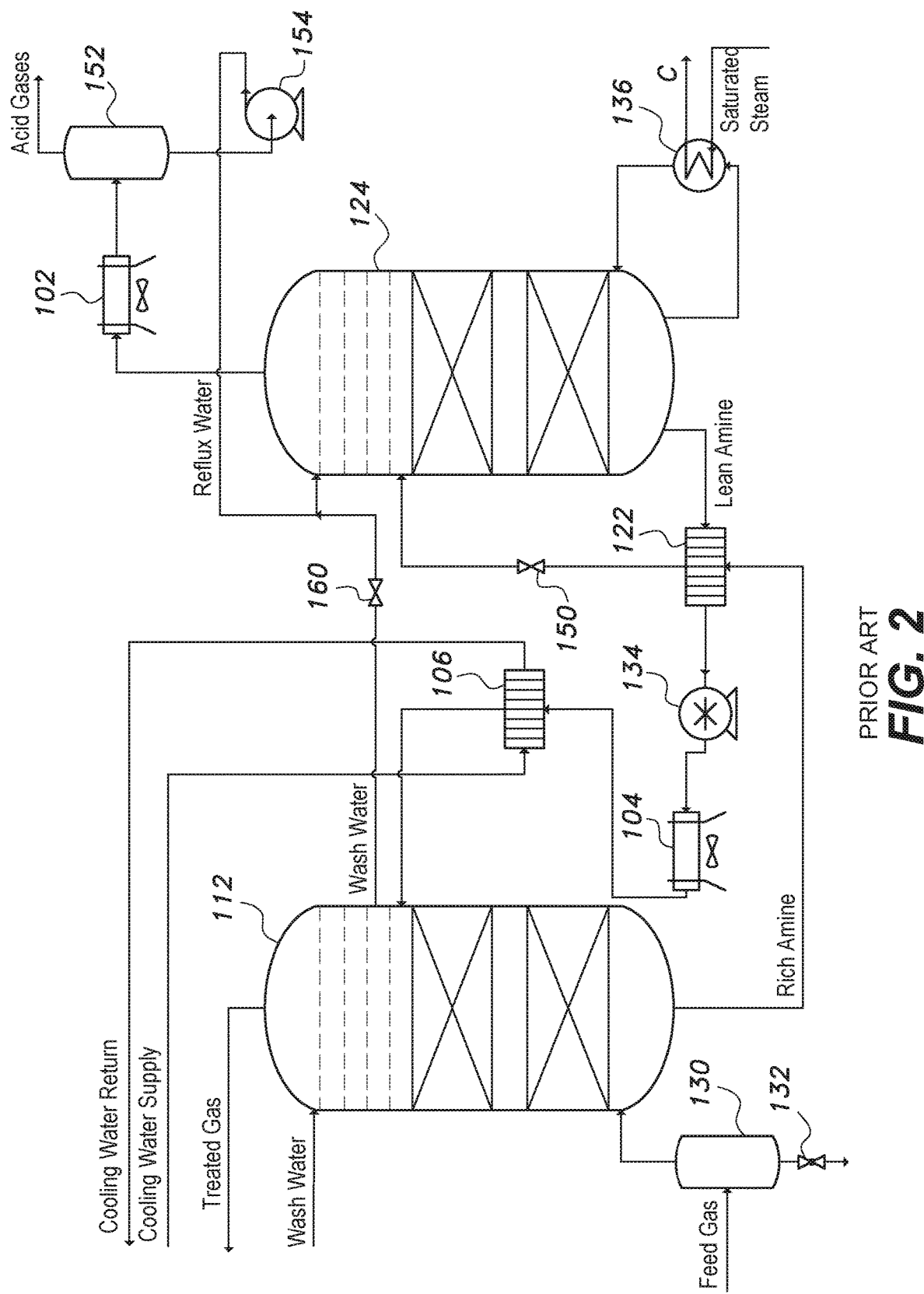
FIG. 2 is a schematic diagram of an acid gas removal system of the prior art.

In comparison to a conventional acid gas removal system, such as that shown in FIG. 2, the present system 10 removes the need for both the lean amine cooler and the trim cooler, thus saving 15% in overall energy consumption, with a 20% reduction in electrical consumption. Furthermore, in addition to a comparative reduction in loss of water of 3%, the present system 10 produces high quality potable water with a recovery rate of 93.6%. Tables 1 and 2 below show the process parameters for the present system 10.

TABLE 1

Process Parameters

| Process Efficiency Parameters | | | | Mass Balance | | |
|---|---|---|---|---|---|---|
| Treated Water Recovery (%) | Ethanol Conc. in Treated Water (ppm, wt) | Ethanol Fraction in mixture (Mass %) | Acid Gas Loading | kg n-pentane per kg Draw Solution | kg n-pentane per kg Circulated Amine | kg Draw Solution per kg Circulated Amine |
| 93.63% | 3.50 × 10$^{-6}$ | 2.841% | 0.48 | 4 | 1.58 | 0.39 |

TABLE 2

Additional Process Parameters

| Temperature | | Specific Energy Consumption | | Specific Energy Saving | |
|---|---|---|---|---|---|
| Treated Water (° C.) | Ethanol Top Product (° C.) | kg Cooling Water per kg Treated Water | kg Steam Reboiler per kg Treated Water | kg Cooling Water per kg Circulated Amine | (Kwh) per kg Circulated Amine |
| 45 | 33.82 | 0 | 0 | 0.51 | 0.024 |

It is to be understood that the combined acid gas removal and water filtration system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A combined acid gas removal and water filtration system, comprising:
    an absorption liquid solvent capable of removing acidic gases from gaseous hydrocarbons;
    a refrigerant;
    a contactor having:
        a gas inlet adapted for receiving a stream of gaseous hydrocarbons;
        a gas outlet adapted for providing an outlet for the gaseous hydrocarbons after removal of acidic gases therefrom, the gaseous hydrocarbons being contacted by the absorption liquid solvent and the acidic gases being removed therefrom by absorption into the absorption liquid solvent inside the contactor;
        an absorption liquid inlet for introducing the absorption liquid solvent into the contactor; and
        an absorption liquid outlet for removing used absorption liquid solvent having the acidic gases absorbed therein from the contactor;
    a first heat exchanger in fluid communication with the contactor, the first heat exchanger being configured for receiving the used absorption liquid solvent and heating the used absorption liquid solvent to output heated solvent;
    a stripper in fluid communication with the first heat exchanger, the stripper being configured for receiving the heated solvent and separating the heated solvent into an acidic gas waste stream and recycled absorption liquid solvent, the recycled absorption liquid solvent providing a heat source to the first heat exchanger for heating the used absorption liquid solvent;
    a second heat exchanger in fluid communication with the first heat exchanger, the second heat exchanger being configured for receiving the recycled absorption liquid solvent and for receiving the refrigerant from a refrigerant tank for cooling the recycled absorption liquid solvent to form at least a portion of the absorption liquid solvent received by the contactor through the absorption liquid inlet thereof;
    a draw solution comprising ethanol;
    a forward osmosis filtration system having a feed side, a draw side, and a semipermeable membrane disposed between the feed side and the draw side, the feed side having an input adapted for connection to a source of brine for filling the feed side with brine, the draw side having an input connected to the draw solution for filling the draw side with the draw solution; and
    an absorber tank configured for receiving the refrigerant from the second heat exchanger and for receiving the draw solution diluted by water passing from the brine through the semipermeable membrane from the draw side of the forward osmosis filtration system by osmotic pressure, such that the refrigerant absorbs ethanol from the dilute draw solution, producing pure water and a mixture of ethanol and the refrigerant, the mixture of ethanol and the refrigerant being returned to the refrigerant tank and a portion of the pure water being received by the contactor through a wash water inlet thereof.

2. The combined acid gas removal and water filtration system as recited in claim 1, wherein the first heat exchanger comprises a plate-plate heat exchanger.

3. The combined acid gas removal and water filtration system as recited in claim 2, wherein the second heat exchanger comprises a plate-plate heat exchanger.

4. The combined acid gas removal and water filtration system as recited in claim 1, wherein said absorption liquid solvent comprises methyl diethanolamine (MDEA) and a piperazine (PZ) additive.

5. The combined acid gas removal and water filtration system as recited in claim 1, wherein the refrigerant is n-pentane.

6. The combined acid gas removal and water filtration system as recited in claim 1, further comprising a reboiler connected to the stripper for heating the heated solvent for stripping acidic gases from the heated solvent in the stripper.

7. The combined acid gas removal and water filtration system as recited in claim 1, further comprising a reflux drum in fluid communication with the first heat exchanger for receiving the acidic gas waste stream from the first heat exchanger for reflux thereof.

8. The combined acid gas removal and water filtration system as recited in claim 1, further comprising a knock out drum connected to the gas inlet of the contactor for removing solid and liquid impurities from the stream of gaseous hydrocarbons.

9. The combined acid gas removal and water filtration system as recited in claim 8, further comprising a draw solution tank containing aqueous ethanol solution.

10. The combined acid gas removal and water filtration system as recited in claim 9, wherein a further portion of the pure water is recycled through the draw solution tank.

11. The combined acid gas removal and water filtration system as recited in claim 10, wherein water removed from the stream of gaseous hydrocarbons by the knock out drum is mixed with the brine being fed into the feed side of the forward osmosis filtration system.

12. A combined acid gas removal and water filtration system, comprising:
- an absorption liquid solvent capable of removing acidic gases from gaseous hydrocarbons, the absorption liquid solvent being methyl diethanolamine (MDEA) and a piperazine (PZ) additive;
- a refrigerant and a refrigerant tank, the refrigerant being stored in the refrigerant tank, the refrigerant being n-pentane;
- a draw solution and a draw solution tank, the draw solution being stored in the draw solution tank, the draw solution being an aqueous solution of ethanol;
- a contactor having:
  - a gas inlet adapted for receiving a stream of crude natural gas;
  - a gas outlet adapted for providing an outlet for the natural gas after removal of acidic gases therefrom, the crude natural gas being contacted by the absorption liquid solvent and the acidic gases being removed therefrom by absorption into the absorption liquid solvent inside the contactor;
  - an absorption liquid inlet for introducing the absorption liquid solvent into the contactor; and
  - an absorption liquid outlet for removing from the contactor used absorption liquid solvent having the acidic gases absorbed therein;
- a first heat exchanger in fluid communication with the contactor, the first heat exchanger being configured for receiving the used absorption liquid solvent from the absorption liquid outlet and heating the used absorption liquid solvent to output heated solvent;
- a stripper in fluid communication with the first heat exchanger, the stripper being configured for receiving the heated solvent from the first heat exchanger and stripping the acidic gases from the heated solvent using steam to produce an acidic gas waste stream and recycled absorption liquid solvent, the recycled absorption liquid solvent being coupled to the first heat exchanger to provide a heat source to the first heat exchanger for heating the used absorption liquid solvent;
- a second heat exchanger in fluid communication with the first heat exchanger, the second heat exchanger being configured for receiving the recycled absorption liquid solvent from the first heat exchanger and for receiving the refrigerant from the refrigerant tank for cooling the recycled absorption liquid solvent to form at least a portion of the absorption liquid solvent received by the contactor through the absorption liquid inlet thereof;
- a forward osmosis filtration unit having a feed side, a draw side, and a semipermeable membrane disposed between the feed side and the draw side, the feed side having an input adapted for connection to a source of brine to fill the feed side with brine, the draw side having an input connected to the draw solution tank to fill the draw side with the draw solution, whereby water from the brine selectively passes through the semipermeable membrane by osmotic pressure and is mixed into the aqueous ethanol solution to form a dilute draw solution; and
- an absorber column having a refrigerant inlet configured for receiving the refrigerant from the second heat exchanger and configured for receiving the dilute draw solution from the draw side of the forward osmosis filtration unit, the absorber column having a plurality of stages wherein the refrigerant directly contacts the dilute draw solution to separate desalinated, pure water from the dilute draw solution, the absorber column having a bottom water outlet for selectively releasing the pure, desalinated water and a top outlet for selectively releasing a mixture of the refrigerant and non-aqueous ethanol, the system being configured for returning the mixture of the refrigerant and nonaqueous ethanol to the refrigerant tank.

13. The combined acid gas removal and water filtration system as recited in claim 12, wherein the first heat exchanger comprises a plate-plate heat exchanger.

14. The combined acid gas removal and water filtration system as recited in claim 13, wherein the second heat exchanger comprises a plate-plate heat exchanger.

15. The combined acid gas removal and water filtration system as recited in claim 12, further comprising a reboiler connected to the stripper and connected to an external source of saturated steam for mixing the heated solvent with the saturated steam and then stripping the acidic gases from the heated solvent in the stripper.

16. The combined acid gas removal and water filtration system as recited in claim 12, further comprising a reflux drum in fluid communication with the first heat exchanger for receiving the acidic gas waste stream from the first heat exchanger for reflux thereof.

17. The combined acid gas removal and water filtration system as recited in claim 12, further comprising a knock out drum connected to the gas inlet of the contactor for removing solid and liquid impurities from the stream of natural gas before feeding the natural gas into the contactor.

18. The combined acid gas removal and water filtration system as recited in claim 17, further comprising a connection between the bottom water outlet of the absorber column and the draw solution tank, whereby a portion of the pure water released from the absorber column is recycled through the draw solution tank.

* * * * *